US009652907B2

(12) United States Patent
Geerlings

(10) Patent No.: US 9,652,907 B2
(45) Date of Patent: May 16, 2017

(54) FIXED LOCATION BASED TRAINABLE TRANSCEIVER FOR THE CONTROL OF REMOTE DEVICES SYSTEMS AND METHODS

(71) Applicant: GENTEX CORPORATION, Zeeland, MI (US)

(72) Inventor: Steven L. Geerlings, Holland, MI (US)

(73) Assignee: GENTEX CORPORATION, Zeeland, MI (US)

(*) Notice: Subject to any disclaimer, the term of this patent is extended or adjusted under 35 U.S.C. 154(b) by 0 days.

(21) Appl. No.: 14/706,361

(22) Filed: May 7, 2015

(65) Prior Publication Data

US 2015/0325113 A1 Nov. 12, 2015

Related U.S. Application Data

(60) Provisional application No. 61/990,519, filed on May 8, 2014.

(51) Int. Cl.

*G05B 19/00* (2006.01)
*G05B 23/00* (2006.01)
(Continued)

(52) U.S. Cl.

CPC ........... *G07C 9/00* (2013.01); *G07C 9/00007* (2013.01); *G08C 17/02* (2013.01); *G08C 23/04* (2013.01); *G08C 2201/20* (2013.01)

(58) Field of Classification Search

CPC . G08C 17/02; G08C 2201/20; G07C 9/00007
(Continued)

(56) References Cited

U.S. PATENT DOCUMENTS 7,084,781 B2 8/2006 Chuey
7,183,941 B2 2/2007 Chuey
(Continued)

FOREIGN PATENT DOCUMENTS

EP 2 129 059 A1 12/2009

OTHER PUBLICATIONS

International Search Report and Written Opinion dated Jul. 2, 2015, received in corresponding International Application No. PCT/US2015/029617, 7 pages.
International Preliminary Report on Patentability and Transmittal mailed Nov. 17, 2016, received in corresponding International Application No. PCT/US2015/029617, 6 pages.

*Primary Examiner* — Tanmay Shah
(74) *Attorney, Agent, or Firm* — Foley & Lardner LLP; Bradley D. Johnson

(57) ABSTRACT

A system for controlling a remote device from a vehicle includes a control device in the vehicle. The control device includes an operator input device configured to receive a user, input, a control circuit coupled to the operator input device, and a first communications device coupled to the control circuit. The control circuit is configured to transmit a control signal in response to the user input. The system further includes a trainable transceiver remote from the vehicle including a second communications device configured to receive the control signal, a processing circuit coupled to the second communications device, and a transceiver circuit coupled to the processing circuit. The processing circuit configured to format an activation signal in response to the control signal, and the processing circuit is further configured to transmit the activation signal via the transceiver circuit, wherein the activation signal is configured to control the remote device.

20 Claims, 5 Drawing Sheets

(51) Int. Cl.

| | |
|---|---|
| ***G06F 7/00*** | (2006.01) |
| ***G06F 7/04*** | (2006.01) |
| ***G06K 19/00*** | (2006.01) |
| ***G08B 29/00*** | (2006.01) |
| ***G08C 19/00*** | (2006.01) |
| ***H04B 1/00*** | (2006.01) |
| ***H04B 3/00*** | (2006.01) |
| ***H04L 9/14*** | (2006.01) |
| ***H04L 9/32*** | (2006.01) |
| ***H04Q 1/00*** | (2006.01) |
| ***H04Q 9/00*** | (2006.01) |
| ***G07C 9/00*** | (2006.01) |
| ***G08C 17/02*** | (2006.01) |
| ***G08C 23/04*** | (2006.01) |

(58) Field of Classification Search
USPC ........................................................ 340/5.25
See application file for complete search history.

(56) References Cited

U.S. PATENT DOCUMENTS

| | | | |
|---|---|---|---|
| 7,609,687 | B2 | 10/2009 | Kobayashi et al. |
| 7,679,488 | B2 | 3/2010 | Drummond et al. |
| 7,887,115 | B2 | 2/2011 | Dassen |
| 7,970,446 | B2 | 6/2011 | Witkowski et al. |
| 8,165,527 | B2 | 4/2012 | Sims et al. |
| 8,311,490 | B2 | 11/2012 | Witkowski et al. |
| 8,634,888 | B2 | 1/2014 | Witkowski et al. |
| 8,686,840 | B2 | 4/2014 | Drummond et al. |
| 8,843,066 | B2 | 9/2014 | Chutorash et al. |
| 2006/0232376 | A1* | 10/2006 | Blaker .................... B60R 25/24 340/5.22 |
| 2012/0126942 | A1 | 5/2012 | Geerlings et al. |
| 2012/0184200 | A1* | 7/2012 | Chutorash .............. G08C 17/02 455/1 |
| 2012/0274455 | A1 | 11/2012 | Pilat et al. |

* cited by examiner

FIXED LOCATION BASED TRAINABLE TRANSCEIVER FOR THE CONTROL OF REMOTE DEVICES SYSTEMS AND METHODS

CROSS-REFERENCE TO RELATED APPLICATIONS

This application claims the benefit of U.S. Provisional Application No. 61/990,519, filed May 8, 2014, which is hereby incorporated by reference in its entirety.

BACKGROUND OF THE INVENTION

The present invention relates generally to the field of trainable transceivers and the control of remote devices. A trainable transceiver generally sends and/or receives wireless signals using a transmitter, receiver, and/or transceiver. The wireless signals may be used to control other devices. For example, a trainable transceiver may send a wireless control signal to operate a garage door opener. A trainable transceiver may be trained to operate with a particular remote device. Training may include providing the trainable transceiver with control information for use in generating an activation signal used in controlling the remote device. It is challenging and difficult to develop trainable transceivers which are easy to operate. It is further challenging and difficult to develop trainable transceivers which may be located remote from a vehicle and controlled from a vehicle.

SUMMARY OF THE INVENTION

One embodiment of the invention relates to a system for controlling a remote device from a vehicle, including a control device in the vehicle. The control device includes an operator input device configured to receive a user input, a control circuit coupled to the operator input device, and a first communications device coupled to the control circuit. The control circuit is configured to transmit a control signal in response to the user input. The system further includes a trainable transceiver remote from the vehicle. The trainable transceiver includes a second communications device configured to receive the control signal, a processing circuit coupled to the second communications device, and a transceiver circuit coupled to the processing circuit. The processing circuit is configured to format an activation signal in response to the control signal, and the processing circuit is further configured to transmit the activation signal via the transceiver circuit. The activation signal is configured to control the remote device.

Another embodiment of the invention relates to a method for controlling a remote device from a vehicle. The method including receiving a user input, using an operator input device, at a control device in the vehicle, and transmitting a control signal, using a first communications device, from the control device. The method further including receiving the control signal at a trainable transceiver, using a second communications device. The trainable transceiver is remote from the vehicle. The method also including processing the control signal, using a processing circuit, at the trainable transceiver, formatting, using the processing circuit, an activation signal based on the control signal and training information, and transmitting the activation signal from the trainable transceiver using a transceiver circuit to the remote device.

Another embodiment of the invention relates to a system for controlling a remote device from a vehicle. The system includes a control device and a trainable transceiver. The control device includes an operator input device configured to receive a user input, a control circuit coupled to the operator input device, and a first communications device coupled to the control circuit. The control circuit is configured to transmit a control signal in response to the user input using the first communications device and a first communications protocol, and the control signal is formatted to cause an intermediate device to retransmit the control signal using a second communications device and a second communications protocol different from the first communications protocol. The trainable transceiver is located remotely from the vehicle and includes a third communications device configured to receive the control signal using the second communications protocol, a processing circuit coupled to the second communications device, and a transceiver circuit coupled to the processing circuit. The processing circuit is configured to format an activation signal in response to receiving the control signal, the processing circuit is further configured to transmit the activation signal via the transceiver circuit, and the trainable transceiver is configured to format the activation signal to control the remote device based on the control signal and information stored in the trainable transceiver as part of a training process to control the remote device.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION OF THE PREFERRED EMBODIMENTS

Figure 1:
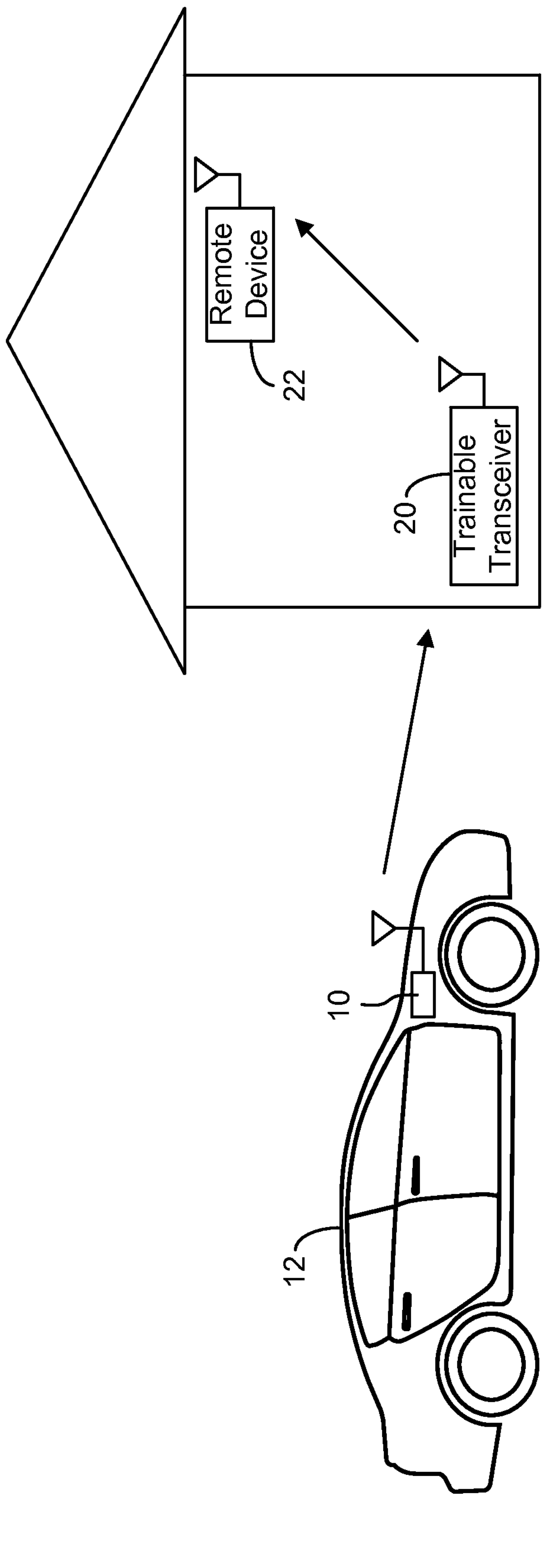
FIG. 1 illustrates a control device located in a vehicle for controlling a trainable transceiver located remote from the vehicle according to an exemplary embodiment.

Referring to FIG. 1, a vehicle 12 may include, within the vehicle 12, a control device 10. The control device 10 may be configured to be in communication with a trainable transceiver 20 which is located remote from the vehicle 12. The communication between the control device 10 and the trainable transceiver 20 may be unidirectional or bi-directional. The control device 10 may be configured to transmit, to the trainable transceiver 20, a control signal which controls the trainable transceiver 20.

The trainable transceiver 20 may be configured to receive the control signal. Based on the control signal, the trainable transceiver 20 may send an activation signal to one or more remote devices 22. The activation signal may activate or otherwise control the remote device 22. In some embodiments, the trainable transceiver 20 and the remote device 22 are in unidirectional communication. The trainable transceiver 20 may send activation signals to the remote device 22. In other embodiments, the trainable transceiver 20 and the remote device 22 are in bi-directional communicational. In some embodiments, the trainable transceiver 20 may send activation signals to the remote device 22, and the remote device 22 may send signals to the trainable transceiver 20 (e.g., signals indicating a status of the remote device 22).

The control device 10 may cause the trainable transceiver 20 to control the remote device 22 through the control signal and activation signal. In one embodiment, the control device 10 is integral to the vehicle 12. For example, the control device 10 may be included in the vehicle 12 by the vehicle manufacturer. In other embodiments, the control device 10 is added to the vehicle 12 (e.g., permanently attached, removably attached, or otherwise included in the vehicle 12) by a user. As explained in greater detail with reference to FIG. 2A, the control device 10 may include components shared with other vehicle systems.

The trainable transceiver 20 and remote device 22 are located remote from the vehicle 12 and/or the control device 10. The remote location may be a home, office, or other fixed location which is not included within the vehicle 12. In one embodiment, the trainable transceiver 20 is placed by a user within the user's home (e.g., in the garage). The trainable transceiver 20 is placed such that the remote devices 22 which the user desires to control are located within the transmission range of the trainable transceiver 20.

Remote devices 22 may include devices configured to be controlled by a wireless signal. Remote devices 22 may be any device located remote from the control device 10 and/or the trainable transceiver 20. For example, remote devices 22 may include devices such as a garage door opener, gate opener, lights, security system, and/or other device which is configured to receive activation signals and/or control signals. Remote devices 22 may be located at a user's home, office, or other location.

Activation signals may be wired or, preferably, wireless signals transmitted to the remote device 22 from the trainable transceiver 20. Activation signals may include control data, encryption information (e.g., a rolling code, rolling code seed, look-a-head codes, secret key, fixed code, or other information related to an encryption technique), or other information transmitted to the remote device 22. Activation signals may have parameters such as frequency or frequencies of transmission, encryption information (e.g., a rolling code, fixed code, or other information related to an encryption technique), identification information (e.g., a serial number, make, model or other information identifying the remote device 22), and/or other information related to formatting an activation signal to control a particular remote device.

In some embodiments, the trainable transceiver 20 is trained to control one or more remote devices 22. Training the trainable transceiver 20 may include providing the trainable transceiver 20 with one or more activation signal parameters. For example, the trainable transceiver 20 may be placed into a learning or training mode by a user (e.g., by pushing a button on the trainable transceiver 20). The trainable transceiver 20 may then receive a signal from an original transmitter associated with the remote device 22 (e.g., a remote control which was provided by the manufacturer of the remote device 22). The trainable transceiver 20 may determine one or more activation signal parameters based on the signal received from the original transmitter. These parameters may then be used by the trainable transceiver 20 to control the remote device 22 via a transmitted activation signal. In other embodiments, the trainable transceiver 20 may be trained using other techniques. For example, a user may provide the trainable transceiver 20 with information related to the remote device 10 (e.g., via a user interface or input/output device). For example, the trainable transceiver 20 may receive a device identifier (e.g., code associated with the device) which the trainable transceiver 20 uses in conjunction with pre-stored data to determine one or more activation signal parameters associated with the remote device 22.

With continued reference to FIG. 1, the control device 10 and the trainable transceiver 20 are paired to allow for communication between the control device 10 and the trainable transceiver 20 in some embodiments. The communication between the control device 10 and the trainable transceiver 20 (e.g., the control signal transmitted from the control device 10 to the trainable transceiver 20) may be encrypted. Advantageously, this may provide for secured operation of the system and prevent others from obtaining the control signal associated with controlling one or more remote devices 22. In order to provide for communications and/or secured communications, the control device 10 and the trainable transceiver 20 may be paired or otherwise linked to one another. In one embodiment, the control device 10 and the trainable transceiver 20 are paired using one or more Bluetooth pairing methods. For example, a user may set a pin for the trainable transceiver 20 (e.g., via a user interface or input/output device of the trainable transceiver 20). Alternatively or additionally, a pin may be set for the trainable transceiver 20 by the manufacturer. A user may enter the pin at the control device 10 in order for the control device 10 to be paired with the trainable transceiver 20. The pairing process may include sharing encryption data. For example, the trainable transceiver 20 may provide the control device 10 with an encryption seed value for use in communicating with the trainable transceiver 20. In other embodiments, other encryption techniques may be used.

In further embodiments, other paring techniques may be used. For example, the trainable transceiver 20 may have a password (e.g., set by the manufacturer and/or customizable by the user). The trainable transceiver 20 may accept control signals from all control devices but determine which control signals include the correct password. The trainable transceiver 20 may execute control signals which include the correct password. In order to pair the control device 10 with the trainable transceiver 20, a user may input the password to the control device 10 (e.g., using an operator input device included in the control device 10). The trainable transceiver 20 may determine if the password from the control signal matches the password of the trainable transceiver 20 using a processing circuit and a comparison to a password stored in memory. A user may customize the password using an a user interface and/or input/output device included in the trainable transceiver 20.

Figures 2A, 2B:
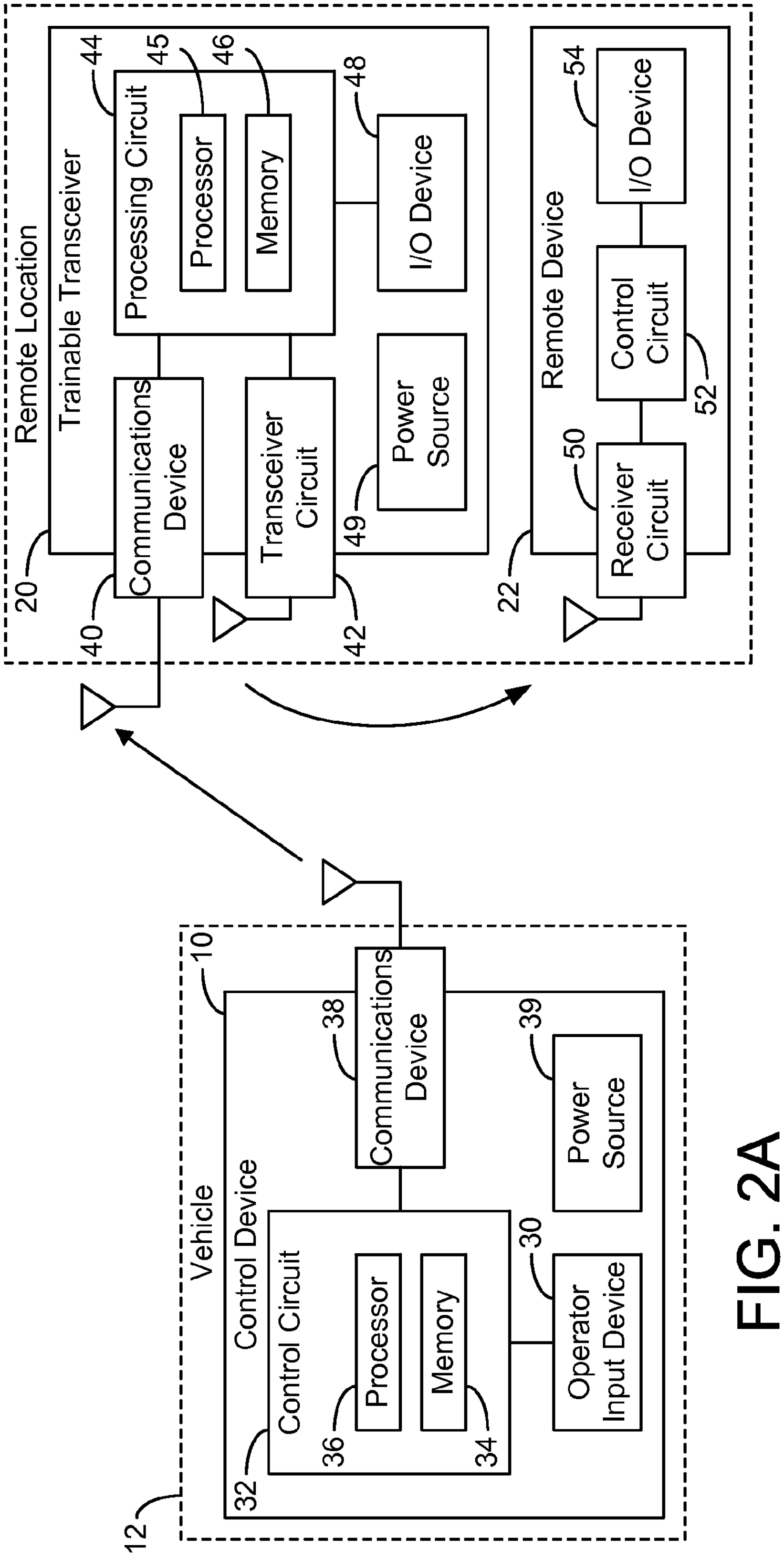
FIG. 2A illustrates the components of a control device located within a vehicle according to an exemplary embodiment.
FIG. 2B illustrates the components of a trainable transceiver and remote device located remote from the vehicle according to an exemplary embodiment.

Referring now to FIG. 2A, the components of the control device 10 are illustrated according to an exemplary embodiment. As previously discussed, the control device 10 may be located within a vehicle. In one embodiment, the control device 10 is permanently included in the vehicle. For example, the control device 10 may be integrated with other systems of the vehicle's electronics systems (e.g., the control device shares a power source, operator input device, communications device and/or other components with another vehicle electronics system such as an infotainment system). In other embodiments, the control device 10 is located within the vehicle 12 but is removable. For example, the control device 10 may be battery powered and may be removed from the vehicle. In such a case, the control device 10 may communicate with the trainable transceiver 20 while located outside of the vehicle 12. For example, the control device 10 may be taken with a user on a walk or other activity and be used to control a garage door opener or other remote device upon returning to the user's home or other location.

In one embodiment, the control device 10 includes one or more operator input devices 30. The operator input device 30 may be one or more buttons. For example, the operator input device 30 may be three hard key buttons. In some embodiments, the operator input device 30 may include input devices such as touchscreen displays, switches, microphones, knobs, touch sensors (e.g., projected capacitance sensor, resistance based touch sensor, or other touch sensor), proximity sensors (e.g., projected capacitance, infrared, ultrasound, infrared, or other proximity sensors), or other hardware configured to generate an input from a user action. In additional embodiments, the operator input device 30 may display data to a user or provide other outputs. For example, the operator input device 30 may include a display screen (e.g., a display as part of a touchscreen, liquid crystal display, e-ink display, plasma display, light emitting diode (LED) display, or other display device), speaker, haptic feedback device (e.g., a vibration motor), LEDs, or other hardware component for providing an output. In some embodiments, the operator input device 30 is connected to a control circuit 32. The control circuit 32 may send information and or control signals or instructions to the operator input device 30. For example, the control circuit 32 may send output instructions to the operator input device 30 causing the display of an image. The control circuit 32 may also receive input signals, instructions, and/or data from the operator input device 30.

In one embodiment, the operator input device 30 is separate from other vehicle electronics systems. In other embodiments, the operator input device 30 is shared by or otherwise integrated with vehicle electronics systems. For example, the operator input device 30 may be a touchscreen display incorporated into a vehicle infotainment system. In other embodiments, the operator input device 30 includes one or more buttons integrated with a rear view mirror.

As previously explained, the operator input device 30 may be used by a user to pair the control device 10 with the trainable transceiver 20 located in a remote location. For example, the user may input a password, pin, or other information related to the trainable transceiver 20 using the operator input device 30. The operator input device 30 may include an output device which displays the password, pin, or other information to the user as the user enters the information. In some embodiments, the operator input device 30 may display a prompt asking for the input of a password, pin, or other information when setting up the control device 10 for controlling the trainable transceiver 20. For example, the control device 10 may identify all trainable transceivers within communications range (e.g., by pinging the trainable transceivers or receiving an identification ping from the trainable transceivers using a communications device). A user may be prompted to select one trainable transceiver from a list of available trainable transceivers and may then be further prompted to enter the corresponding pin or password.

In other embodiments, the control device 10 may be placed into a pairing mode via a user input received through the operator input device 30. A user may then place the trainable transceiver 20 into a pairing mode via a user interface and/or input/output device included in the trainable transceiver 20. With both devices in pairing mode, the trainable transceiver 20 may be made visible to the control device 10. The user may then select the trainable transceiver 20 and pair with the trainable transceiver 20 by entering a pin or password via the operator input device 30. Multiple control devices may be paired with a single trainable transceiver. A single control device may be paired with multiple trainable transceivers. The control device 10 may send a control signal to all trainable transceivers to which it is paired or the control device may transmit a control signal to a single trainable transceiver (e.g., based on signal strength, location, or other parameters used to estimate which trainable transceiver the user intends to control). In some embodiments, pairing may be completed using the trainable transceiver 20 rather than the control device 10. In other words, a pin or password associated with the control device 10 may be entered at the trainable transceiver 20. In some embodiments, multiple control devices may be associated with or paired with one trainable transceiver. In further embodiments, other pairing techniques may be used.

The control device 10 may include a control circuit 32 for carrying out the functions of the control device 10 described herein. The control circuit 32 may include various types of control circuitry, digital and/or analog, and may include a microprocessor, microcontroller, application-specific integrated circuit (ASIC), graphics processing unit (GPU), or other circuitry configured to perform various input/output, control, analysis, and other functions to be described herein. In further embodiments, the control circuit 32 may function as a controller for one or more hardware components included in the control device 10. For example, the control circuit 32 may function as a controller for a touchscreen display or other operator input device 30, a controller for a transceiver, transmitter, receiver, or other communication device (e.g., implement a Bluetooth communications protocol).

The control circuit 32 may be coupled to or include memory 34. The memory 34 may be used to facilitate the functions of the control device described herein. Memory 34 may be volatile and/or non-volatile memory. In some embodiments, the control circuit 32 reads and writes to memory 34. Memory 34 may include computer code modules, data, computer instructions, or other information which may be executed by the control circuit or otherwise facilitate the functions of the control device described herein. For example, memory 34 may include encryption codes, pairing information, identification information, a device registry, etc. Memory 34 and/or the control circuit 32 may facilitate the functions described herein using one or more programming techniques, data manipulation techniques, and/or processing techniques such as using algorithms, routines, lookup tables, arrays, searching, databases, comparisons, instructions, etc.

In some embodiments, the control circuit 32 includes a processor 36. The processor 36 may be implemented as a general-purpose processor, an application specific integrated circuit (ASIC), one or more field programmable gate arrays (FPGAs), a digital-signal-processor (DSP), a group of processing components, or other suitable electronic processing components. The memory 34 may be communicably connected to the processor 36 and provide computer code or instructions to the processor 36 for executing the processes and functions described herein.

In some embodiments, the control circuit 32 receives inputs from operator input devices 30 and processes the inputs. The inputs may be converted into control signals, data, instructions, etc. The control circuit 32 may control the communications device and use the communications device to communicate (e.g., receive signals and/or transmit signals) with one or more trainable transceivers. The control circuit 32 may also be used in the pairing process (e.g., receiving a pin or password and storing it in memory for use with a corresponding trainable transceiver).

In one embodiment, the control circuit 32 is separate from other vehicle electronics systems. In other embodiments, the control circuit 32 is shared by or otherwise integrated with vehicle electronics systems. For example, the control circuit 32 may be a general purpose processor included in a vehicle electronics system. The general purpose processor may handle computing tasks associated with the control device 10 as described herein and other computing tasks. For example, the general purpose processor may perform computing tasks related to a vehicle infotainment system, vehicle communication system, vehicle dynamics, and/or other vehicle systems or functions.

In further embodiments, the control circuit 32 of the control device 10 is in communication with other computing resources of the vehicle. For example, the control circuit 32 may be located with the operator input device in the rear view mirror of the vehicle. The control circuit 32 may act as a controller for the operator input device 30 and/or otherwise perform the functions of the control device 10 discussed herein. The control circuit 32 may also provide instructions to or otherwise communicate with additional processors, memory, control circuits, or other control circuitry of the vehicle. Other control circuitry of the vehicle may facilitate and/or perform the functions of the control device 10 disclosed herein. In other embodiments, the control circuit 32 may communicate instructions to a communications device of the vehicle (e.g., a Bluetooth transceiver included in the vehicle such as a Bluetooth transceiver for connecting a smartphone to an infotainment system). The control circuit 32 may cause the communications device to transmit a control signal to the trainable transceiver 20 (e.g., in response to a user input received via the operator input device).

With continued reference to FIG. 2A, the control device may include a communications device 38 for use in communicating with one or more trainable transceivers 20. The communications device 38 may provide data transfer to and from the trainable transceiver 20. The communications device 38 may provide this data transfer through a communications connection established between the control device 10 and the trainable transceiver 20. The communications connection may be a wired or preferably wireless connection between the communication device 38 and the trainable transceiver 20. For example, the communications connection may be a connection over a wireless network using protocols such as those related to WiFi, Zigbee, Bluetooth, or other wireless communication schemes. In further embodiments, other communications connections may be used such as infrared, optical, ultrasound, or other communications techniques.

The communications device 38 may be a wireless networking device or other communication hardware. For example, the communications device 38 may be or include a Bluetooth transceiver, Bluetooth Low Energy transceiver, WiFi transceiver, cellular transceiver, optical transceiver, radio frequency transceiver, or other transceiver capable of wireless communications. The communications device 38 may communicate with the trainable transceiver 20 using one or more protocols associated with the above described and/or other communication hardware. In some embodiments, the communications device 38 of the control device 10 and/or a communications device of the trainable transceiver 20 function as a wireless access point to allow for communication between the control device 10 and the trainable transceiver 20. In other embodiments, the communications device 38 of the control device 10 is configured to access the internet (e.g., the communications device 38 is a cellular transceiver communicating using internet communication protocols) and communicate with the trainable transceiver 20 via the internet. In further embodiments, the communications device 38 of the control device 10 is configured to access a wireless network to which the trainable transceiver 20 is connected. For example, the communications device 38 of the control device 10 may connect to a WiFi network (e.g., created by a router) to which the trainable transceiver 20 is connected. Other communications hardware and/or protocols may be used to allow for communication between the control device 10 and the trainable transceiver 20 via the communications device 38 of the control device 10. In some embodiments, the communications device 38 may include additional hardware such as processors, memory, integrated circuits, antennas, etc. In some embodiments, the control device 10 and the trainable transceiver 20 communicate using frequencies other than those used in the transmission of activation signals. For example, the control device 10 and the trainable transceiver 20 may communicate using a radio frequency transmission at a frequency other than that used by garage door openers or other remote devices.

With continued reference to FIG. 2A, the communications device 38 may be controlled by the control circuit 32. For example, the control circuit 32 may format a control signal to be sent using the communications device 38. The control circuit 32 may be formatted based on a user input received by the operator input device 30. For example, a user may push one of three buttons of an operator input device 30 with each button corresponding to a particular channel. The control circuit 32 may determine which button was pushed and cause the communications device 38 to transmit a control signal identifying the channel. As described in more detail with reference to FIG. 4, using this and/or other techniques, the control device 10 may communicate to the trainable transceiver 20 which remote device 22 the trainable transceiver 20 is to control using an activation signal sent by the trainable transceiver 20.

In some embodiments, the communications device 38 of the control device 10 is separate from other vehicle electronics systems. In other embodiments, the communications device 38 is shared with or is otherwise a part of other vehicle electronics systems. For example, the communications device 38 may be a Bluetooth transceiver, cellular transceiver, or other transceiver included in a vehicle electronics system for use with vehicle functions such as an infotainment system, navigation system, or vehicle communications. Advantageously, the control device 10 may use a communications device included within the vehicle 12 for another purpose. This may reduce the cost of the system described herein as the vehicle 12 already includes a communications device. This may also provide a benefit as the communications device included in the vehicle 12 may have a greater range than one which would be included in the control device 10. For example, the vehicle 12 may include a cellular transceiver which would be less practical to include in a removable control device 10 (e.g., as a larger battery may be needed, costs would be increased, a larger antenna may be needed, etc.).

In other embodiments, the vehicle 12 includes a built in Bluetooth Low Energy or other radio frequency transmitter. The Bluetooth Low Energy or other radio frequency transmitter may be integrated with the vehicle 12 or other vehicle electronics systems. The vehicle 12 may be manufactured including the Bluetooth Low Energy or other radio frequency transmitter. In some embodiments, this Bluetooth Low Energy or other radio frequency transmitter is dedicated to communicating with a remotely located trainable transceiver 20. Its only purpose is to communicate with the trainable transceiver 20.

The control device 10 may further include a power source 39. In embodiments where the control device 10 is removable from the vehicle 12, the power source 39 is self-contained within the control device 10. For example, the power source 39 may be a battery. In embodiments where the control device 10 is integrated with the vehicle 12 (e.g., shares one or more components with a vehicle electronics system), the power source 39 may be self-contained or draw power from a vehicle system. For example, the power source 39 may be a battery dedicated to the control device 10 or may be a vehicle battery. The power source 39 may be a common power source (e.g., vehicle battery and/or vehicle power system) used by all vehicle electronics systems.

Referring now to FIG. 2B the components of the trainable transceiver 20 and remote device 22 are illustrated according to an exemplary embodiment. As previously discussed, the trainable transceiver 20 and/or remote device 22 may be located in a remote location which is distinct from the vehicle 12. For example, the trainable transceiver 20 may be located within the garage of a user's home. In some embodiments, the trainable transceiver 20 is located in other remote locations such as within a user's home, in a user's office, or other locations remote from a user's vehicle. In other embodiments, the trainable transceiver 20 may be located within a user's vehicle.

The trainable transceiver 20 may include a communications device 40 which is configured to be in communication with a communications device 38 of the control device 10. The communications device 40 of the trainable transceiver 20 allows the trainable transceiver 20 to receive a control signal from the control device 10. The communications device 40 may further allow the trainable transceiver 20 to pair with the control device 10. The communication device 40 of the trainable transceiver 20 may be the same type of communications device as the communications device 38 included in the control device 10. For example, the communications devices 38 and 40 in both the trainable transceiver 20 and the control device 10 may be a Bluetooth transceiver. In other embodiments, the communications device 40 of the trainable transceiver 20 may differ from the communications device 38 of the control device 10. In this case, the communications device 40 of the trainable transceiver 20 is configured to allow for communication with the control device 10 (e.g., the communications device 40 of the trainable transceiver 20 is capable of communicating using the same protocol as the communications device 38 of the control device 10).

As described above with reference to FIG. 2A, the communications device 40 of the trainable transceiver 20 may create a wired or preferably wireless connection between the communication device 40 and the control device 10. For example, the communications connection may be a connection over a wireless network using protocols such as those related to WiFi, Zigbee, Bluetooth, or other wireless communication schemes. In further embodiments, other communications connections may be used such as infrared, optical, ultrasound, or other communications techniques.

The communications device 40 may be a wireless networking device or other communication hardware. For example, the communications device 40 of the trainable transceiver 20 may be or include a Bluetooth transceiver, Bluetooth Low Energy transceiver, WiFi transceiver, cellular transceiver, optical transceiver, radio frequency transceiver, or other transceiver capable of wireless communications. The communications device 40 may communicate with the control device 10 using one or more protocols associated with the above described and/or other communication hardware. In some embodiments, the communications device 40 of the trainable transceiver 20 allows for a wired connection with a router or modem. This may enable the trainable transceiver 20 to communicate with the control device 10 via the internet. For example, the control device 10 may send a control signal over the internet using a cellular transceiver to the trainable transceiver 20 which receives the control signal using a wired (e.g., Ethernet) or wireless (e.g., WiFi transceiver) connection to a router or modem. In some embodiments, the communications device 40 may include additional hardware such as processors, memory, integrated circuits, antennas, etc.

In other embodiments, the trainable transceiver 20 does not include a distinct communications device. In such an embodiment, a transceiver circuit 42 of the trainable transceiver 20 is configured to communicate both with the control device 10 and the remote device 22. In this case, the transceiver circuit 42 may be capable of communicating with the communications device 38 of the control device 10 using the protocol of the communications device 38.

The communications device 40 may be coupled to a processing circuit 44 included in the trainable transceiver 20. The processing circuit 44 may receive a control signal from the control device 10 via the communications device 40 or transceiver circuit 42 of the trainable transceiver 20. The processing circuit 44 may process the control signal. For example, the processing circuit 44 may use the control signal (e.g., information included in the control signal such as a channel identifier, device identifier, encryption information, and/or other information) to determine which remote device to control (e.g., determine to which remote device to send an activation signal using the transceiver circuit 42). In some embodiments, the processing circuit 44 may further determine what information to include in the activation signal based on the control signal. For example, the control signal may specify how to control the remote device 22 (e.g., turn off the remote device, turn on the remote device, etc.). Using this and/or other information, the processing circuit 44 may configure or format the activation signal to be sent using the transceiver circuit 42.

In some embodiments, the processing circuit 44 is used to train the trainable transceiver 20. For example, the processing circuit 44 may analyze a signal from an original transmitter received via the transceiver circuit 42 and determine one or more activation signal parameters associated with the remote device 22. The processing circuit 44 may store activation signal parameters associated with one or more remote devices in memory. In some embodiments, the processing circuit 44 may store (e.g., in memory) activation signal parameters associated with a plurality of device codes. Based on a device code received from a user (e.g., via a user interface and/or input/output device), the processing circuit 44 may look up one or more activation signal parameters and store them as associated with a channel or particular control signal identifier.

In some embodiments, the processing circuit 44 may also perform one or more pairing functions used to pair the control device 10 and the trainable transceiver 20. For example, the processing circuit 44 may store (e.g., in memory) a pin or password associated with the trainable transceiver 20. The processing circuit 44 may determine whether a control signal received from a control device 10 includes the pin or password associated with the trainable transceiver 20. The processing circuit 44 may then execute only those control signals (e.g., instructions or commands included in the control signal) which contain the corresponding pin or password stored in memory of the trainable transceiver 20. As an additional example, the processing circuit 44 may carry out the functions associated with Bluetooth pairing in order to pair the trainable transceiver 20 and the control device 10.

In some embodiments, the processing circuit 44 of the trainable transceiver 20 includes a processor 45 and/or memory 46 used to facilitate and/or perform the functions of the trainable transceiver discussed above and elsewhere herein. Memory 46 may be volatile and/or non-volatile memory. For example, memory 46 may be random access memory, read only memory, flash memory, hard disk storage, flash memory storage, solid state drive memory, etc. In some embodiments, the control circuit 44 reads and writes to memory 46. Memory 46 may include computer code modules, data, computer instructions, or other information which may be executed by the processing circuit 44 or otherwise facilitate the functions of the trainable transceiver 20 described herein. For example, memory 46 may include encryption codes, pairing information, identification information, a device registry with corresponding information, etc. Memory 46 and/or the processing circuit 45 may facilitate the functions described herein using one or more programming techniques, data manipulation techniques, and/or processing techniques such as using algorithms, routines, lookup tables, arrays, searching, databases, comparisons, instructions, etc.

The processor 45 may be implemented as a general-purpose processor, an application specific integrated circuit (ASIC), one or more field programmable gate arrays (FPGAs), a digital-signal-processor (DSP), a group of processing components, or other suitable electronic processing components. The memory 46 may be communicably connected to the processor 45 and provide computer code or instructions to the processor for executing the processes described herein.

With continued reference to FIG. 2B, the transceiver circuit 42 allows the trainable transceiver 20 to transmit and/or receive wireless communication signals. The wireless communication signals may be transmitted to or received from a variety of wireless devices (e.g., an original transmitter, remote device, and/or a control device in some embodiments). The transceiver circuit 42 may be controlled by the processing circuit 44. For example, the processing circuit 44 may turn on or off the transceiver 42, the processing circuit 44 may send data using the transceiver 42, format information, format an activation signal, receive a control signal, and/or send or receive other signals or data via the transceiver circuit 42, or otherwise control the transceiver circuit 42. Inputs from the transceiver circuit 42 may also be received by the processing circuit 44. In some embodiments, the transceiver circuit 42 may include additional hardware such as processors, memory, integrated circuits, antennas, etc. The transceiver circuit 42 may process information prior to transmission or upon reception and prior to passing the information to the processing circuit 44. In some embodiments, the transceiver circuit 42 may be coupled directly to memory 46 (e.g., to store encryption data, retrieve encryption data, etc.).

In one embodiment, the processing circuit 44 receives a control signal from the control device 10 using either the communications device 40 or the transceiver circuit 42. The processing circuit 44 may then determine, based on the control signal, which remote device, of which the trainable transceiver 20 is trained to control, will be controlled by an activation signal. As described in greater detail with reference to FIG. 4, the processing circuit 44 may determine to which remote device to send an activation signal based on information contained within the control signal. This information may be an identifier of the remote device 22, an identifier of a channel (e.g., an identifier corresponding to one of three buttons on the control device 10 and/or trainable transceiver 20), and/or other information. The processing circuit 44 may then determine one or more activation signal parameters for the remote device based on information stored in memory 46 (e.g., activation signal parameters associated with the remote device during the training process) and/or in the activation signal. The processing circuit 44 may then format the activation signal and transmit it using the transceiver circuit 42. The activation signal may be received by the remote device 22 and cause the remote device 22 to activate. In some embodiments, the activation signal may include a specific instruction or command which, when received by the remote device, causes the remote device 22 to take a particular action.

As discussed above, the activation signal may include identification information (e.g., a serial number, make, model or other information identifying a remote device), an instruction or command to be carried out by the remote device 22, an encryption key, and/or other information related to controlling a particular remote device 22. The activation signal may be sent at a particular frequency or frequencies corresponding to a particular remote device 22. The activation signal may be a radio frequency signal or signals in the ultra-high frequency range, typically between 260 and 960 megahertz (MHz) although other frequencies may be used.

With continued reference to FIG. 2B, the trainable transceiver 20 may include a user interface and/or input/output device 48. The input/output device 48 may be or include one or more buttons. For example, the input/output device 48 may be three hard key buttons. In some embodiments, the input/output device 48 may include input devices such as touchscreen displays, switches, microphones, knobs, touch sensors (e.g., projected capacitance sensor resistance based touch sensor, resistive touch sensor, or other touch sensor), proximity sensors (e.g., projected capacitance, infrared, ultrasound, infrared, or other proximity sensor), or other hardware configured to generate an input from a user action. In additional embodiments, the input/output device 48 may display data to a user or provide other outputs. For example, the input/output device 48 may include a display screen (e.g., a display as part of a touchscreen, liquid crystal display, e-ink display, plasma display, light emitting diode (LED) display, or other display device), speaker, haptic feedback device (e.g., vibration motor), LEDs, or other hardware component for providing an output.

The input/output device 48 may be coupled to the processing circuit 44. The processing circuit 44 may receive inputs from the input/output device 48. The processing circuit 44 may also control or otherwise provide outputs via the input/output device 48. The input/output device 48 may be used to facilitate the functions described herein. For example, the input/output device 48 may be used to initiate the training of the trainable transceiver 20 or otherwise be used to train the trainable transceiver 20 (e.g., selecting a channel using one of three buttons on the input/output device 48 for which the remote device 22 will correspond to one of three buttons of the operator input device 30 of the control device 10). Continuing the example, the input/output device 48 may be used to pair the trainable transceiver 20 to the control device 10 (e.g., entering a pairing mode, customizing a password or pin for the trainable transceiver 20, etc.).

In some embodiments, the trainable transceiver 20 includes a power source 49. The power source 49 may be an internal or external power source. In one embodiment, the power source 49 is mains power. The trainable transceiver 20 may be plugged into a socket in a home, garage, office, or other location. In some embodiments, the power source 49 is or includes a battery. The battery may serve as a battery backup when mains power is unavailable.

With continued reference to FIG. 2B, the remote device 22 may include a receiver circuit 50, control circuit 52, input/output device 54, and/or other components. The receiver circuit 50 may be configured to receive an activation signal from either an original transmitter or the trainable transceiver 20 which is trained to control the remote device 22. The remote device 22 may be activated or otherwise controlled by the activation signal. For example, the remote device 22 may process the activation signal using the control circuit 54 or other device. The remote device 22 may then perform an action. For example, a garage door opener which is a remote device may use an input/output device such as an electric motor to raise or lower a garage door in response to an activation signal received via the receiver circuit. In some embodiments, the remote device 22 may include a transceiver rather than or in addition to the receiver circuit 50. The transceiver circuit 42 may enable two way communication with the trainable transceiver 20. For example, the remote device 22 may transmit a remote device status or other information to the trainable transceiver 20. The trainable transceiver 20 may transmit this or other information to the control device 10.

Figure 3A:
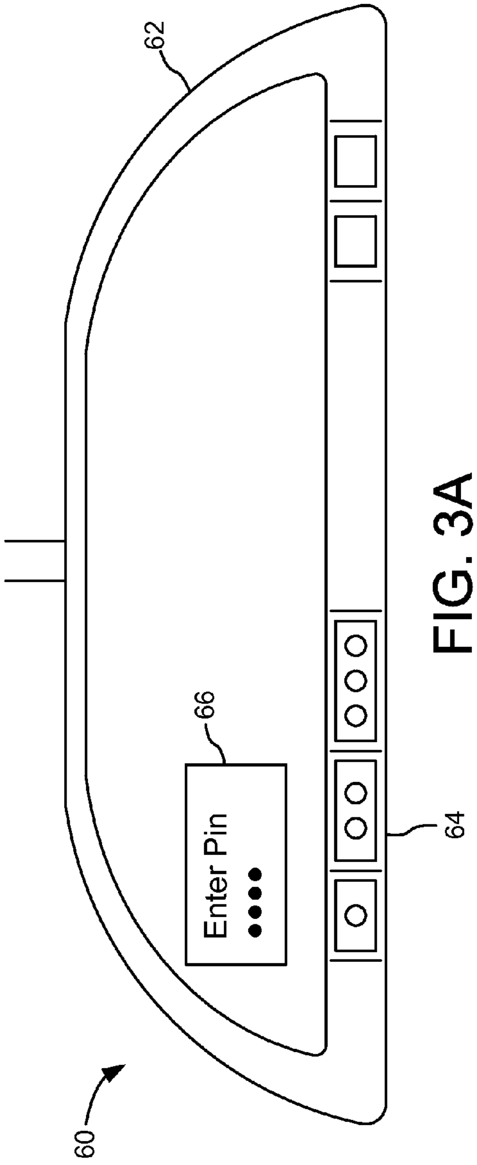
FIG. 3A illustrates a control device according to an exemplary embodiment.

Referring now to FIG. 3A, a control device 60 is illustrated according to an exemplary embodiment. The control device 60 may be partially or entirely included in a rear view mirror 62 of a vehicle. The control device 60 may have an operator input device included in the rear view mirror 62. For example and as illustrated, the control device 60 may include three buttons of an operator input device 64 included in the rear view mirror 62. In some embodiments, the rear view mirror 62 may include a display 66 of the operator input device 64 included in or behind and viewable in the rear view mirror 62. In other embodiments (not illustrated), the control device 60 may be included in other portions of the vehicle (e.g., the infotainment system) or may be separable from the vehicle (e.g., as a standalone device) as previously discussed.

Figure 3B:
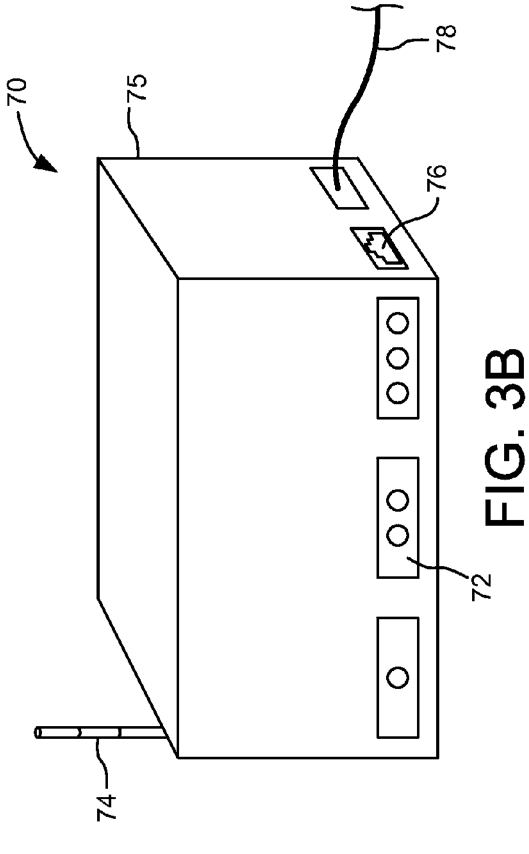
FIG. 3B illustrates a trainable transceiver according to an exemplary embodiment.

Referring now to FIG. 3B, a trainable transceiver 70 is illustrated according to an exemplary embodiment. The trainable transceiver 70 may include an input/output device 72 (e.g., three buttons) as previously described. The input/output device 72 may include a display or other features described but not illustrated. The trainable transceiver 70 may include an antenna 74, Ethernet port 76, or other hardware for use with a communications device and/or transceiver circuit. The trainable transceiver 70 may further include a wired connection 78 to a power source such as mains power. The trainable transceiver 70 may be contained within a housing 75 as illustrated. The housing 75 may be configured to protect the components of the trainable transceiver 70. The trainable transceiver 70 may therefore be placed in an environment such as the floor of a garage.

Figure 4:
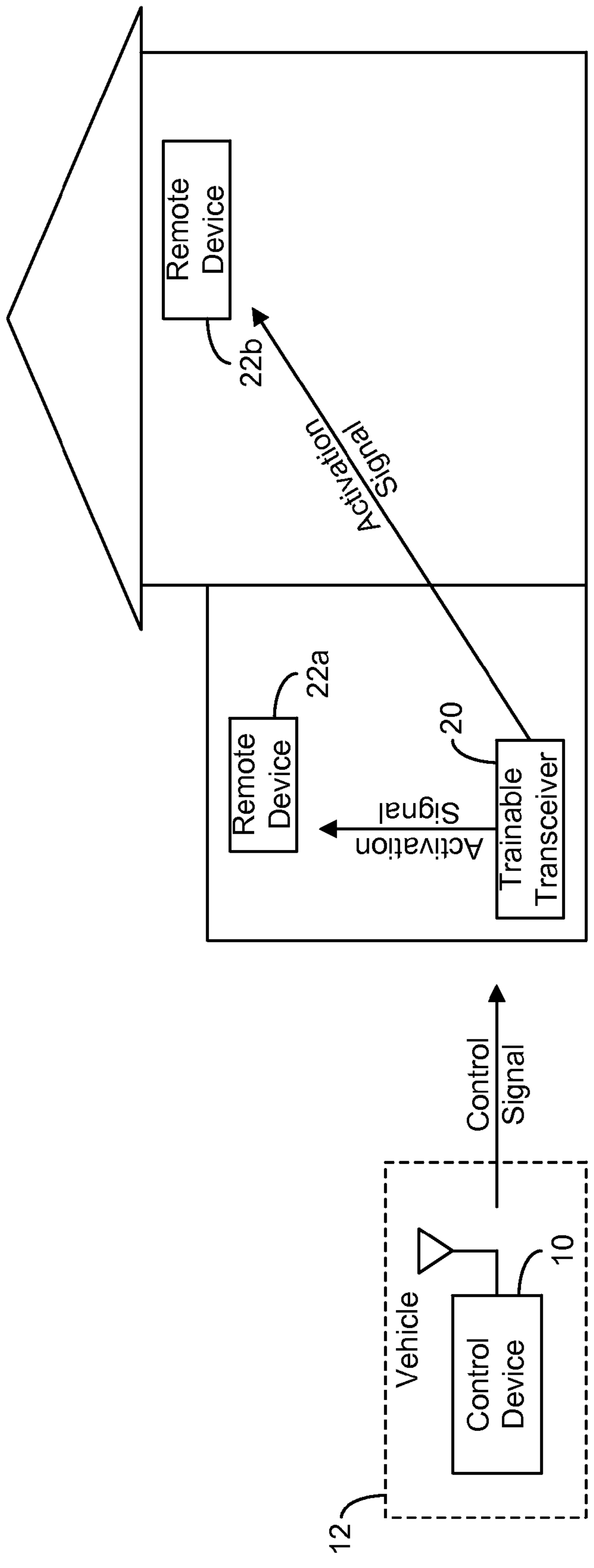
FIG. 4 illustrates a control device located within a vehicle in communication with a trainable transceiver located remotely and which is trained to control a remote device.

Referring now to FIG. 4, the control device 10 located within the vehicle 12 is illustrated as in communication with the trainable transceiver 20 located in a remote location according to an exemplary embodiment. The control device 10 may transmit a control signal to the trainable transceiver 20 as previously described. In response to the control signal, the trainable transceiver 20 may send one or more activation signals to one or more remote devices 22 (e.g., a garage door opener, lighting control system, etc.).

In one embodiment, the trainable transceiver 20 is trained to control a plurality of remote devices 22*a* and 22*b*. During the training process, each remote device 22*a* and 22*b* may be associated with a channel using the input/output device of the trainable transceiver 20. For example, a first remote device 22*a* may be trained to a first channel by holding down the first button of a plurality of buttons (e.g., three buttons) on the trainable transceiver 20. This may cause the trainable transceiver 20 to enter a training mode with respect to the first channel. A user may then cause an original transmitter to transmit a signal which is received by the trainable transceiver 20 and used (e.g., by the processing circuit) to train the trainable transceiver 20 to control the first remote device 22*a*. The first button may be pushed again to exit training mode with respect to the first channel. The process may be repeated for the second remote device 22*b* and channel and with other remote devices and/or other channels. In some embodiments device codes or other identifiers may be entered instead of the trainable transceiver 20 receiving a signal from an original transmitter. Multiple remote devices may be trained to the same channel (e.g., a garage door opener and lighting control system). For example, the trainable transceiver 20 may be paced in training mode for a particular channel. A user may then cause the original transmitter of the first remote device 22*a* to transmit an activation signal. The user may then cause the original transmitter of the second remote device 22*b* to transmit an activation signal. The user may then exit training mode with respect to that channel by pressing the button associated with that channel.

Each channel of the trainable transceiver 20 may correspond to a channel of the control device. For example, the system may have three channels with the first channel corresponding to the first button of the trainable transceiver 20 and the first button of the control device 10. Therefore, pushing the first button of the control device 10 sends a control signal to the trainable transceiver 20 which causes the trainable transceiver 20 to send an activation signal for all devices trained to the first channel (e.g., using the first button during the training process). The control signal may contain an identifier or instruction indicating the channel.

In other embodiments, other techniques may be used to control a particular remote device using the control device 10. For example, a user may customize which remote devices are controlled by which buttons of the control device 10 using the operator input device of the control device 10. The trainable transceiver 20 may transmit information to the control device 10 identifying the devices 22 for which the trainable transceiver 20 is trained to control. A user may then associate one or more remote devices 22 with each button or other input device of the operator input device. The control device 10 may then include (e.g., using the control circuit) one or more device identifiers in the control signal sent in response to a user input. The trainable transceiver 20 may then format one or more activation signals based on this and/or other information received in the control signal and/or stored in memory of the trainable transceiver. In further embodiments, other techniques may be used to associate one or more particular remote devices 22 with one or more inputs of the control device 10 such that the desired remote device 22 is controlled by a user input received at the control device.

Figure 5:
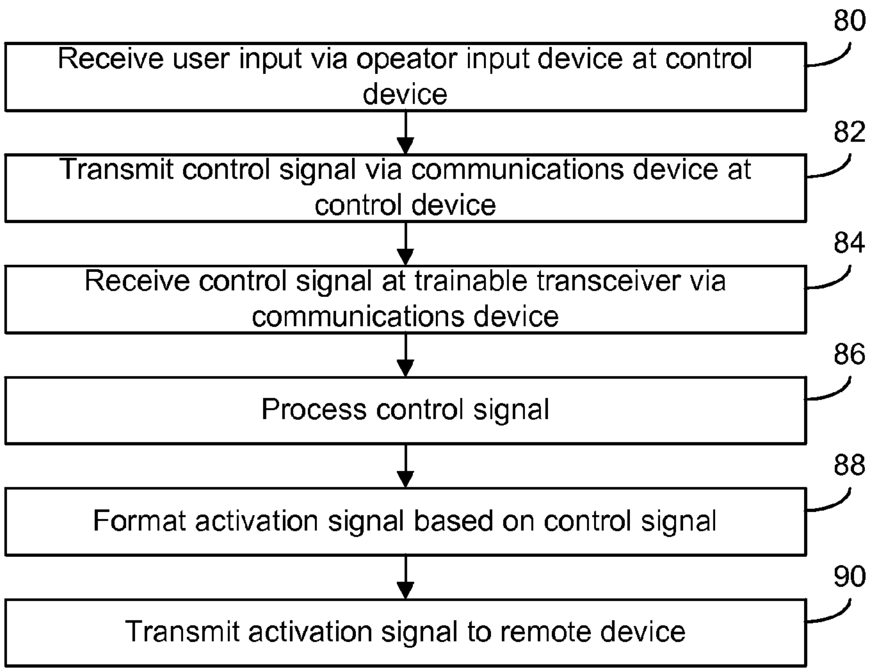
FIG. 5 illustrates a flow chart for a method of controlling a remote device using a control device and a trainable transceiver according to an exemplary embodiment.

Referring now to FIG. 5, a method of controlling the remote device 22 using the control device 10 and trainable transceiver 20 system described herein is illustrated according to an exemplary embodiment. The trainable transceiver 20 may be trained to control one or more remote devices 22 (e.g., using an original transmitter and/or other technique) and paired with the control device 22. The remote device 22 may be controlled via the control device 10. The control device 10 receives a user input. The user input may be received by the operator input device 30 of the control device 10 (step 80). For example, a user may push one of three buttons to control the remote devices 22 trained to the corresponding channel. The user input may be provided to the control circuit 32. The control circuit 32 may then determine or format the control signal to be transmitted. In some embodiments, the control circuit 32 formats the control signal by including a channel identifier in the control signal. In other embodiments, the control circuit 32 formats the control signal by including one or more identifiers corresponding to the remote devices 22 associated with the input received (e.g., the user may customize which devices are controlled by each user input). The control circuit 32 may further format the control signal based on information related to the pairing of the control device 10 and the trainable transceiver 20. For example, the control circuit 32 may format the control signal to include an identifier of the trainable transceiver 20 to which the control device 10 is paired, include an encryption key, use a frequency associated with the trainable transceiver 20, or otherwise format the control signal for reception by a particular trainable transceiver 20.

The control device 10 may then transmit the formatted control signal using the communications device 38 of the control circuit 32 (step 82). For example, the control circuit 32 may transmit the control signal including the above identified information and/or other information using a Bluetooth transceiver and Bluetooth protocol. In other embodiments, other communication devices and/or protocols may be used. For example, the communications device 38 may be any radio frequency transceiver, a cellular transceiver, optical transceiver, or other type of transceiver.

The trainable transceiver 20 may then receive the control signal (step 84). The trainable transceiver 20 may receive the control signal using a corresponding communications device 40. For example, if the control signal is sent using a Bluetooth transceiver, the trainable transceiver 20 may receive the control signal using a Bluetooth transceiver. In other embodiments, the trainable transceiver 20 may receive the control signal using a different communications device which is configured to operate using the same communications protocol as that of the communications device 38 of the control device 10. For example, the control device 10 may transmit the control signal via the internet using a cellular transceiver and internet communications protocol. The trainable transceiver 20 may receive the control signal using the same or compatible internet communications protocol and a different communications device such as a wired connection to a router or modem. In further embodiments, the trainable transceiver 20 does not include a separate communications device, and the control signal is received using the transceiver circuit 42 of the trainable transceiver 20.

The trainable transceiver 20 may then process the control signal (step 86). The received control signal may be processed by the processing circuit 44 coupled to the communications device 40 and/or transceiver circuit 42. Processing the control signal may include determining if the control signal includes a pin or password corresponding to the trainable transceiver 20, determining the channel and/or devices identified in the control signal, determining the instructions and/or command contained in the control signal, and/or otherwise processing the control signal and the information contained therein.

The trainable transceiver 20 may then format one or more activation signals based on the control signal and the processing of the control signal (step 88). For example, the processing circuit 44 may retrieve from memory 46 the frequency, encryption key, remote device identifier, and/or other information to be included in or used to transmit an activation signal to a remote device 22 identified in the control signal. In embodiments where the control signal identifies a channel, the processing circuit 44 may determine which remote devices 22 are associated with the channel by reading from memory 46 the remote device identifiers and/or other information related to the channel identified by the control signal. Using this information and/or other information, the processing circuit 44 may format an activation signal for transmission via the transceiver circuit 42.

The processing circuit 44 may then transmit the activation signal using the transceiver circuit 42 (step 90). The activation signal may be received by the remote device 22. The remote device 22 may then be controlled based on the activation signal. For example, the activation signal may cause the remote device 22 (e.g., a garage door opener) to turn on. In other embodiments (e.g., embodiments in which the activation signal includes a specific command or instruction), the activation signal may cause the remote device 22 to perform a specific action (e.g., raising the garage door, turning on particular lights, etc.).

Figure 6:
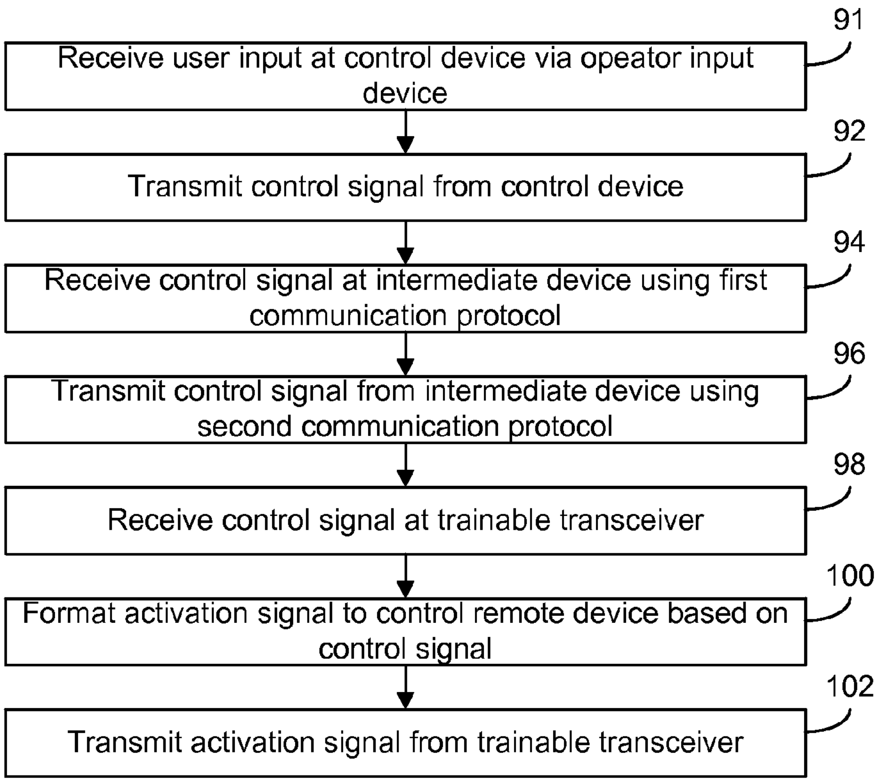
FIG. 6 illustrates a flow chart of a method of controlling a remote device using a control device, an intermediate device, and a trainable transceiver according to an exemplary embodiment.

Referring now to FIG. 6, a flow chart of a method of controlling a remote device using a control device, an intermediate device, and a trainable transceiver is illustrated according to an exemplary embodiment. In one embodiment, control device 10 transmits a control signal via an intermediate device to trainable transceiver 20 located remotely from control device 10. The control signal is formatted to cause trainable transceiver 20 to transmit an activation signal to a remote device 22 for which the trainable transceiver is trained to control.

The control device 10 may receive a user input via operator input device 30 (step 91). For example, control device 10 may be integrated with rearview mirror 60 of vehicle 12. Operator input device 30 may include a series of buttons corresponding to a series of devices which trainable transceiver 20 may be trained to control. In other embodiments, control device 10 may be located in other locations and/or have one or more of the alternative configurations described herein.

In response to receiving the user input, control device 10 transmits a control signal (step 92). The control signal includes information which identifies which input was received so that the information can be passed to trainable transceiver 20 and such that trainable transceiver 20 transmits an activation signal corresponding to the received input and formatted to control the corresponding device. For example, the control signal may include information that the first of three input buttons (e.g., channel one) was pressed by the user. The control signal is transmitted using communications device 38 and is transmitted using a first communications protocol. For example, communications device 38 may be a Bluetooth transceiver and the first communications protocol may be a Bluetooth protocol. Other transceivers and/or communications protocols may be used in alternative embodiments (e.g., WiFi, cellular communications standards, Zigbee, and/or other standards and associated transceivers).

The control signal is received at an intermediate device using the first communications protocol (step 94). The intermediate device is a device capable of communication using a second communications protocol. Advantageously, the intermediate device may be capable of transmitting at a greater range, using the second communications protocol and associated hardware, than the control device 10 using the first communications protocol and/or than a traditional trainable transceiver using a radio frequency transmitter. For example, the intermediate device may be an internet enabled device such as a smartphone, tablet, laptop, or other device. The intermediate device may be capable of communicating using an internet communications protocol. The intermediate device may be further configured to communicate using wireless communications. For example, the intermediate device may be a smartphone or other device which is configured to communicate using internet protocols (e.g., can access the internet) using cellular communications transceivers and/or standards.

In response to receiving the control signal, the intermediate device transmits the control signal using the second communications protocol (step 96). For example, the control signal may be formatted to cause the intermediate device to automatically transmit the control signal. The intermediate device may use an application (e.g., program) running thereon to transmit the control signal automatically upon receipt. In other alternative embodiments, a single communications protocol may be used but different communications hardware may be used. In one embodiment, the intermediate device is a smartphone, tablet, or other mobile communications device which receives the control signal using Bluetooth or WiFi and transmits the control signal using a cellular connection to the internet and an internet communications protocol. The control signal transmitted from the control device 10 may include information used to route the control signal to the trainable transceiver (e.g., an IP address and/or MAC address corresponding with the trainable transceiver 20 and communicated to control device 10 during a pairing process, a universal resource locator address, and/or other routing information).

The control signal transmitted from the intermediate device is received at the trainable transceiver (step 98). For example, the trainable transceiver may include a communications device 40 configured to receive communications from the internet (e.g., a network interface controller or card, a cellular transceiver configured to enable communications over the internet, a WiFi transceiver, and/or other hardware). In some embodiments, the control signal is received after passing through other components (e.g., routing hardware which is part of the internet, a router coupled to the trainable transceiver 20, a modem coupled to the trainable transceiver 20, and/or other hardware).

In response to receiving the control signal, trainable transceiver 20 formats an activation signal to control remote device 22 based on the content of the received control signal (step 100). For example, the control signal may identify a channel for which the trainable transceiver 20 is to transmit an activation signal to the device corresponding with the channel (e.g., channel 1 of 3 total channels). The user input (e.g., pressing a first of three buttons) received at control device 10 thus corresponds to the devices which the trainable transceiver is trained to control (e.g., the trainable transceiver 20 is trained to control a first device using a first of three buttons to enter a training mode corresponding to the first button of both the trainable transceiver 20 and the control device 10). In other embodiments, other techniques described herein may be used to identify, in the control signal, the remote device 22 for which the trainable transceiver 20 is to transmit an activation signal. The activation signal is formatted based on information stored in the trainable transceiver 20 as part of the training process. The trainable transceiver 20 then transmits the activation signal formatted to control the remote device 22 (step 102). For example, the trainable transceiver 20 transmits the activation signal using transceiver circuit 42 and a communications protocol used by the remote device 22.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A system for controlling a remote device from a vehicle, comprising:
- a control device in the vehicle, comprising:
  - an operator input device configured to receive a user input;
  - a control circuit coupled to the operator input device; and
  - a first communications device coupled to the control circuit,
  - wherein the control circuit is configured to transmit a control signal in response to the user input using the first communications device; and
- a trainable transceiver located remotely from the vehicle, comprising:
  - a second communications device configured to receive the control signal;
  - a processing circuit coupled to the second communications device; and
  - a transceiver circuit coupled to the processing circuit;
  - wherein the processing circuit is configured to format an activation signal in response to the control signal, wherein the processing circuit is further configured to wirelessly transmit the activation signal via the transceiver circuit, and wherein the activation signal is formatted to control the remote device.

2. The system of claim 1, wherein the first communications device and the second communications device are configured to use a first communications protocol, and wherein the transceiver circuit is configured to use a second communications protocol.

3. The system of claim 1, wherein the control device is configured to be paired with the trainable transceiver, and wherein the trainable transceiver is configured to receive control signals only from paired control devices.

4. The system of claim 3, wherein the control device is configured to be paired with the trainable transceiver using a Bluetooth training method.

5. The system of claim 3, wherein the control device is configured to be paired with the trainable transceiver using a PIN or password provided by the trainable transceiver and entered using the operator input device of the control device.

6. The system of claim 1, wherein the transceiver circuit performs the functions of the second communications device, and the transceiver circuit and the second communications device are a single transceiver circuit.

7. The system of claim 1, wherein the control signal includes at least one of an identifier, an encryption key, or an instruction.

8. The system of claim 7, wherein the activation signal is formatted based on at least one of the identifier, the encryption key, or the instruction of the control signal.

9. The system of claim 1, wherein the operator input device is included within a rear view mirror of the vehicle.

10. The system of claim 1, wherein the first communications device is at least one of a radio frequency transceiver, Bluetooth transceiver, cellular transceiver, or internet networking device.

11. The system of claim 10, wherein the first communications device is included in the vehicle as a portion of a vehicle electronics system.

12. The system of claim 1, wherein the second communications device is at least one of a radio frequency transceiver, Bluetooth transceiver, cellular transceiver, or internet networking device.

13. The system of claim 1, wherein the trainable transceiver is configured to be trained to control the remote device based on determining one or more activation signal parameters from an a second wireless activation signal received at the transceiver circuit from an original transmitter associated with the remote device in order to format the activation signal for transmission to the remote device based on the one or more activation signal parameters.

14. A method for controlling a remote device from a vehicle, comprising:
- receiving a user input, using an operator input device, at a control device in the vehicle;
- transmitting a control signal, using a first communications device, from the control device;
- receiving the control signal at a trainable transceiver, using a second communications device, wherein the trainable transceiver is remote from the vehicle;
- processing the control signal, using a processing circuit, at the trainable transceiver, formatting, using the processing circuit, an activation signal based on the control signal;
- wirelessly transmitting the activation signal from the trainable transceiver, using a transceiver circuit, to the remote device.

15. The method of claim 14, further comprising pairing the control device and the trainable transceiver prior to transmitting the control signal.

16. The method of claim 14, further comprising training the trainable transceiver prior to transmitting the control signal.

17. The method of claim 16, wherein training the trainable transceiver comprises:
- receiving a user input placing a specific channel into a training mode;
- receiving a signal from an original transmitter associated with the remote device;
- analyzing the signal from the original transmitter to determine one or more activation signal parameters associated with the remote device;
- storing in memory the one or more activation signal parameters based on the signal from the original transmitter; and
- exiting a training mode.

18. A system for controlling a remote device from a vehicle, comprising:
- a control device in the vehicle, comprising:
  - an operator input device configured to receive a user input;

a control circuit coupled to the operator input device; and a first communications device coupled to the control circuit, wherein the control circuit is configured to transmit a control signal in response to the user input using the first communications device and a first communications protocol, and wherein the control signal is formatted to cause an intermediate device to retransmit the control signal using a second communications device and a second communications protocol different from the first communications protocol; and a trainable transceiver located remotely from the vehicle, comprising:

a third communications device configured to receive the control signal using the second communications protocol;

a processing circuit coupled to the second communications device; and a transceiver circuit coupled to the processing circuit;

wherein the processing circuit is configured to format an activation signal in response to receiving the control signal, wherein the processing circuit is further configured to wirelessly transmit the activation signal via the transceiver circuit, and wherein the trainable transceiver is configured to format the activation signal to control the remote device based on the control signal and information stored in the trainable transceiver as part of a training process to control the remote device.

19. The system of claim 18, wherein the first communications protocol is a Bluetooth communications protocol, and wherein the second communications protocol is an internet communications protocol.

20. The system of claim 18, wherein the intermediate device is a smartphone, tablet, or laptop computer.

* * * * *